UNITED STATES PATENT OFFICE.

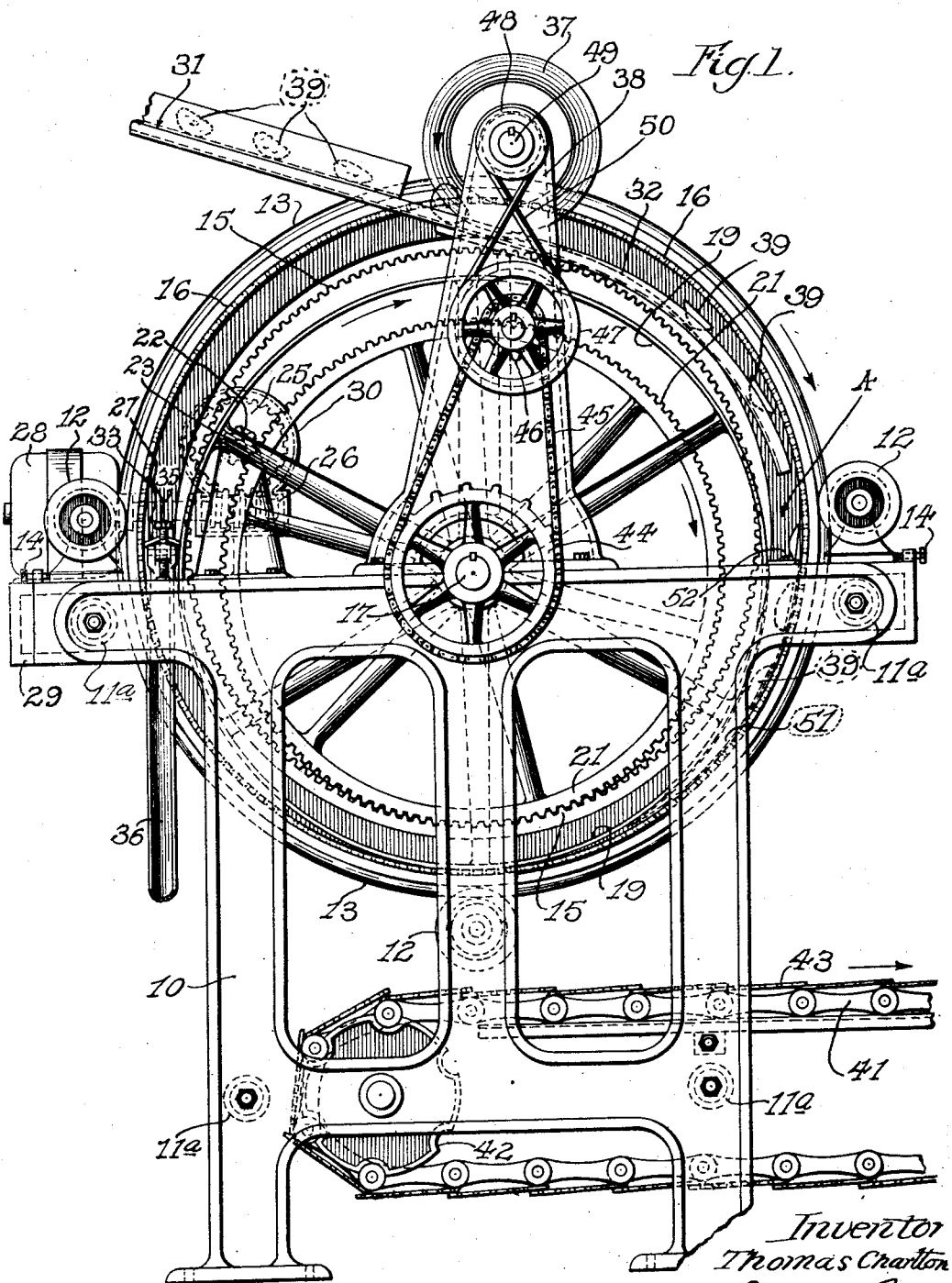

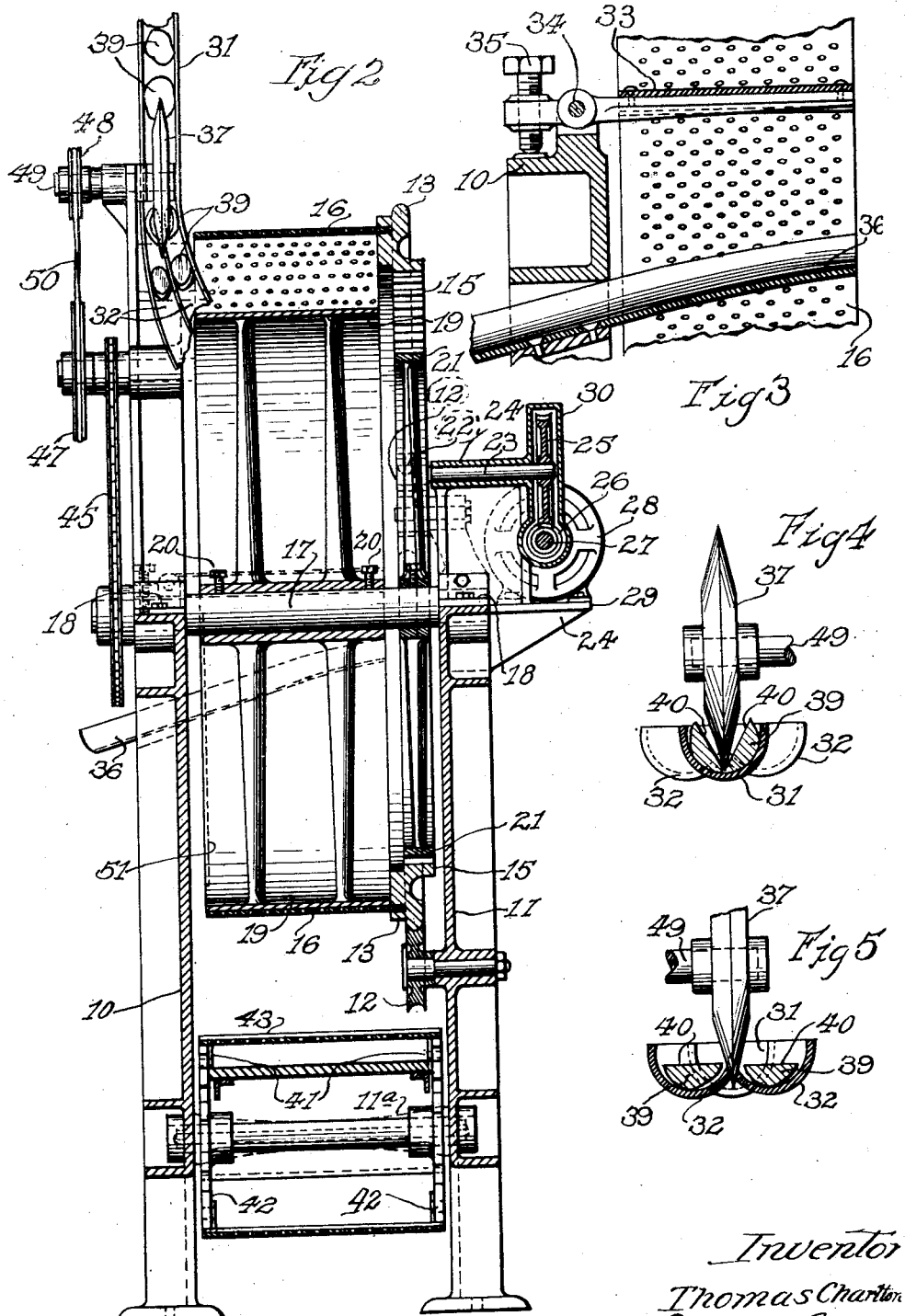

THOMAS CHARLTON, OF CHICAGO, ILLINOIS.

APPARATUS FOR MAKING FOOD PRODUCTS.

1,406,170.   Specification of Letters Patent.   Patented Feb. 14, 1922.

Application filed July 26, 1919. Serial No. 313,564.

*To all whom it may concern:*

Be it known that I, THOMAS CHARLTON, a citizen of the United States, residing at Chicago, in the county of Cook and State of Illinois, have invented certain new and useful Improvements in Apparatus for Making Food Products, of which the following is a specification.

This invention relates to improvements in apparatus for producing a food product from vegetables or fruits, particularly adapted, though not necessarily limited in its use with cooked vegetables or fruit, and one of the objects of the same is to provide an improved apparatus for forcing the pulp out of the skins after the vegetable has been cut, without disrupting or tearing the skin, and in such a manner that no particle of the skin will be mixed in with the pulp.

A further object is to provide an improved machine of this character which will not become clogged during operation and which is provided with improved means for removing the skins after the pulp has been pressed or forced therefrom.

A further object is to provide an improved machine of this character which will be simple, durable, and cheap in construction and effective and efficient in operation and of a large capacity.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which;

Figure 1 is a side elevation of an improved machine of this character constructed in accordance with the principles of this invention.

Figure 2 is a vertical sectional view with parts broken away and parts omitted.

Figure 3 is an enlarged detail view partly in elevation and partly in section of a portion of the apertured or reticulated surface and showing the scraper for removing skins.

Figures 4 and 5 are views partly in elevation and partly in section showing the different steps of the operation of the cutter upon the vegetable or fruit and the manner in which the cutter positions the article with the cut or pulp surface uppermost or exposed.

The present invention will be herein described and claimed for use in connection with potatoes but, it is to be understood that the invention is not to be limited to the use of potatoes alone as it can be used with equal efficiency with any other kind of fruit or vegetable.

Referring more particularly to the drawing, the apparatus is provided with a supporting structure of any desired size and configuration and of any suitable structure such, for instance, as uprights 10 and 11, which are secured together in spaced relation by means of suitable spacing elements 11$^a$. Mounted upon these uprights in any suitable manner such as by means of pulleys or grooved rollers 12, any number of which may be provided, is an annular member 13 having a concaved periphery adapted to enter the grooves of the rollers or pulleys to be rotatably supported thereby. These pulleys or rollers 12 are preferably mounted so as to be adjusted by suitable adjusting devices 14 so as to position the pulleys which respect to the annular member and to cause the pulleys to hold the annular member 13 securely. This annular member is provided with internal gear teeth 15 for a purpose to be hereinafter set forth.

Carried by the annular member 13 and projecting laterally therefrom and arranged preferably within the confines of the periphery of the annular member, is another annular member forming a reticulated or perforated supporting element 16, the apertures or openings through which may be of any desired gage and the element 16 may be of any desired width. The element is connected with the annular member 13 so as to rotate therewith.

Journaled upon and extending across the supporting structure is a shaft 17 mounted in suitable bearings 18. This shaft may be of any desired diameter, extends through the annular members 13—16 and is arranged eccentrically thereto. Carried by the shaft 17 so as to rotate therewith is a pressing or crushing element 19 and which may be secured to the shaft 17 in any suitable manner, such as by fastening devices 20.

Obviously the shaft 17 is mounted in the bearings 18 so as to be adjusted with respect thereto for the purpose of taking up wear as will be understood, for the purpose of obtaining a proper alignment between the active portions of the elements 16 and 19.

This element 19 is preferably of a width substantially equal to the active portion of the element 16 and its periphery is preferably flat or smooth. When the element 19 is in position, and being eccentrically mounted with respect to the element 16, it will be seen from Figures 1 and 2 that a portion only of the surface of the element 19 stands in close proximity to a portion only of the surface 16. This arrangement is provided for the purpose of forcing the pulp of the vegetable or fruit through the reticulated surface 16 when the fruit or vegetable reaches the point at which the two elements are in close proximity and at the same time it will be seen that as the vegetable approaches this point between the two elements, there is a gradually increasing pressure upon the vegetable or fruit, which will result in the extraction or forcing out of the entire pulp from the skins.

The element 19 has connected with it and for rotation therewith an external toothed gear element 21. This gear element and the element 19 may be formed in any suitable manner, that is they may be formed integral or they may be formed separately and connected together in the manner as shown, that is by having both of the elements 19 and 21 secured to the shaft 17 for simultaneous rotation with each other. Inasmuch as the shaft 17 is eccentrically mounted with respect to the gear teeth 15 of the element 13 and as the gear element 21 is also eccentrically mounted, it will be seen from Figure 1 that a portion only of the teeth of the gear 21 mesh with the gear teeth 15 so that when the gear 21 is rotated a rotary motion will be imparted to the element 16.

The gear 21 is rotated in any suitable manner such as by means of a pinion gear 22 connected with a suitable shaft 23 journaled in suitable bearings 24 and connected with the shaft is a worm gear 25. This worm gear 25 meshes with a worm 26 connected with a shaft 27 which in turn is connected with a motor 28. The motor is supported in any convenient position, preferably upon a bracket or platform 29 connected with the main supporting structure.

If desired and in order to protect the gears 25—26, a suitable housing or casing 30 may be provided.

Thus it will be seen that when the motor is operated the worm 26 will be given motion and this motion will be imparted to the worm gear 25, which in turn rotates the shaft 23, and through the medium of the pinion 22, motion will be imparted to the external gear 21. This will impart a rotary movement to the pressing or crushing element 19 in the direction of the arrow in Figure 1. At the same time, and as the gear 21 meshes with the gear teeth 15, a rotary motion will be imparted to the reticulated element surface 16, also in the direction indicated by the arrow in Figure 1 so that the elements 19 and 16 will travel in the same direction at the same peripheral speed.

The vegetable or fruit to be operated upon is fed into the machine preferably by means of an incline or chute 31 which is preferably provided with extensions 32 that direct the article between the elements 19 and 16 preferably at approximately the point A in Figure 1. As the article is delivered from the chute it will fall into the gradually decreasing opening between the elements 19 and 16 and is advanced with the elements until the entire pulp has been forced out of the skin. As the article advances in this gradually decreasing passage it will be seen that a gradually increasing pressure is exerted thereupon with the result that all of the pulp will be forced from the skin and the skin will remain between the two elements and will not enter the openings in the reticulated element 16. After the pulp has been thus expressed from the skins, the skins will be carried by the reticulated element 16 until they reach a point from which they are extracted or removed from the machine. This removal of the skins may be accomplished in any suitable manner such as by means of a suitable scraper 33 which may be of any desired construction, preferably pivotally mounted as at 34 and having an adjusting element 35 so as to properly position the scraper. The scraper is preferably so shaped that it will stand between the two elements and contact with the inner surface of the element 16 and the outer surface or periphery of the element 19. As the skins are thus removed by the scraper they may be delivered into a chute or trough 36 to be conveyed from the machine to any desired point.

One of the essential and more important features of the present invention is the manner in which the article is presented to the reticulated surface. That is to say, the article is fed into the machine in such a manner that the exposed pulp surface or side thereof will stand adjacent the reticulated surface. This is accomplished in any suitable manner. A simple and efficient means for producing this result will now be described.

The article may be cut before it is delivered to the chute 31, or it may be cut as it is traveling from the chute 31 and into the extension 32, and to that end there is provided a suitable cutter 37 preferably of the rotary type which is journaled in a suitable support 38 adjacent the delivery chute. This cutter 37 is of a wedge shaped formation as shown more clearly in Figures 4 and 5 so that when the article is cut thereby the wedge shaped configuration of the cutter co-operating with the substantially U-shaped formation of the chute and its extensions 32 thereof, will force the cut particles of the article 39 away from each other and will cause them to fall into the extensions 32 in the manner shown in Figure 5; that is to say with the pulp surface 40 uppermost or exposed.

As the article travels along the extensions 32, see Figure 1, they will pass therefrom in the position indicated, that is with the pulp surface adjacent the reticulated element or surface 16, and as they are advanced between the elements 16 and 19, it will be seen that the gradually increasing pressure will be exerted from the outer or skin side of the article to force or press the pulp therefrom and through the reticulated surface. As the pulp passes through this surface it will be disintegrated or "riced," the size of the grains being controlled by the size of the apertures or openings in the reticulated surface. The pulp in its disintegrated or "riced" form as it passes through the surface 16 may be collected and conveyed away to any desired point in any suitable manner, such as by means of an endless conveyer 41 of any suitable type.

An efficient conveyer embodies one or more endless elements passing over suitable sprockets 42 and having thereon plates or supports 43 which are preferably apertured or perforated so as to permit circulation of air or fluid therethrough, while the product is being conveyed thereby, and which will serve to dry the product.

The rotary cutter 27 may be given its motion in any suitable manner but preferably from the shaft 17 through the medium of a sprocket 44 secured thereto and over which sprocket a sprocket chain 45 passes. The chain also passes over another sprocket 46 connected with which is a pulley 47 co-operating with a pulley 48 on the shaft 49 of the cutter 37, and over which pulleys 47—48 a suitable driving belt 50 passes. Obviously this belt 50 is arranged in a manner to impart the desired direction of rotation to the cutter 37.

It is of course to be understood that the method of driving the cutter 37 may be varied but the preferred form is shown herein as a means whereby the desired speed of rotation of the cutter may be obtained.

With this improved construction it will be seen that when the pulp is being forced from the skins, the skin will in a measure act as a plunger against the pulp to assist in extracting the same, and it will also be manifest that the skin will not be ruptured or torn during this operation and no particle of the skin will pass through the openings in the element 16, thereby preventing any of the skin from becoming mixed with the pulp. The skin will adhere to the element 16 and will be removed from the machine in the manner set forth.

It will also be seen that by the arrangement of the gradually reduced opening between the elements 19 and 16 into which the article is fed, it will be impossible for the articles to "pile up" upon each other which would result in some of the skins forming an obstruction to the pulp from other portions of the articles. With this arrangement each article is presented with its pulp surface directly against the reticulated surface 16.

In order to insure the proper positioning of the article in the reduced passage and to prevent the article from falling out of the position, and also in a measure to serve as a guard for the opening, a suitable guard plate or shield 51 (see Figure 1) may be provided which may be removably secured in position to cover the opening in any suitable manner such as by means of a fastening device 52, securing the same to any suitable portion of the supporting structure.

While the preferred form of the invention has been herein shown and described, it is to be understood that many changes may be made in the details of construction and in the combination and arrangement of the several parts without departing from the spirit of this invention.

What is claimed as new is:—

1. A machine for making food products from cooked vegetables, embodying means for cutting the vegetable, and means for forcing out the pulp from the skin side of the cut vegetable, the last recited means embodying two co-operating elements one encompassing the other.

2. A machine for making food products from cooked vegetables, embodying means for feeding into the machine vegetables which have been cut to expose the pulp, means for exerting pressure upon the vegetable from the outside and against the skin to force the pulp therefrom, and means for disintegrating the pulp as it is forced from the skin, the last two recited means embodying co-operating elements, one operating within the other.

3. A machine for making food products from vegetables which have the skin thereon and which have been opened to expose the pulp, embodying means for advancing the cut vegetable and exerting a gradually increasing pressure upon the vegetable from the outer and skin surface to force the pulp from the skin, the said means embodying two elements, one operating within the other.

4. A machine for making food products from vegetables which have been opened to expose the pulp, embodying means for advancing the cut vegetable and exerting a gradually increasing pressure upon the vegetable from the outer and skin surface to force the pulp from the skin, a perforated or reticulated surface to which the exposed pulp portion of all of the parts of the cut vegetable is presented and through which the pulp is forced as it leaves the skin, and means for removing the skins, the first recited means and the said reticulated surface traveling in the same direction.

5. A machine for making food products from vegetables which have been opened to expose the pulp, embodying a reticulated or perforated surface to which the exposed pulp portion of the vegetable is presented, means co-operating with the said surface and operating against the outside of the skin to force the pulp from the skin and through the said surface, the said surface and the said means embodying traveling elements one operating within the other.

6. A machine for making food products from vegetables which have been opened to expose the pulp, embodying a recticulated or perforated element to which the exposed pulp portion of the vegetable is presented, an element co-operating with the first said element and operating against the outside of the skin to force the pulp from the skin and through the said reticulated element, one of said elements being of an annular configuration and encompassing the other element, and means for collecting and conveying away the pulp after it has passed through the said surface.

7. A machine for making food products from vegetables which have been opened to expose the pulp, embodying a traveling reticulated or perforated element to which the exposed pulp portion of the vegetable is presented, a traveling element co-operating with the first said element and operating against the outside of the skin to force the pulp from the skin and through the said surface, one of the said elements being of an annular configuration and encompassing the other element, and a conveyor operating adjacent the reticulated element and upon which conveyor the disintegrated pulp is delivered from the reticulated element.

8. A machine for making food products from vegetables which have been opened to expose the pulp, embodying a reticulated or perforated element to which the exposed pulp portion of the vegetable is presented, and an element co-operating with the first said element and operating against the outside of the skin to force the pulp from the skin and through the said reticulated element, one of said elements being of an annular configuration and encompassing the other element.

9. A machine for making food products from vegetables which have been opened to expose the pulp, embodying a reticulated or perforated surface to which the exposed pulp portion of the vegetable is presented, and means co-operating with the said surface and operating against the outside of the skin to force the pulp from the skin and through the said surface, the first recited means and the said reticulated surface embodying two traveling elements one compassing the other.

10. A machine for making food products from vegetables which have been opened to expose the pulp, embodying a reticulated or perforated surface to which the exposed pulp portion of the vegetable is presented, and means co-operating with the said surface and operating against the outside of the skin to force the pulp from the skin and through the said surface, the first recited means and the said reticulated surface embodying two eccentrically arranged rotatable elements between which the vegetable is forced.

11. A machine for making food products from vegetables which have been opened to expose the pulp, embodying a reticulated or perforated surface to which the exposed pulp portion of the vegetable is presented, means co-operating with the said surface and operating against the outside of the skin to force the pulp from the skin and through the said surface, the first recited means and the said reticulated surface embodying two eccentrically arranged rotatable elements between which the vegetable is forced, a scraper operating between the said elements to remove the skins after the pulp has been forced therefrom.

12. A machine for making food products from vegetables which have been opened to expose the pulp, embodying two co-operating traveling elements having the same direction of movement and between which the vegetable is presented, one of said elements embodying an apertured surface, the other element operating upon the vegetable to force the pulp therefrom and through the said apertured surface, and means for presenting a cut vegetable between the said elements in such a position that the pulp side of each of the cut parts of the vegetable will be adjacent the same apertured surface and the co-operating element will operate against the outside of the skin.

13. A machine for making food products from vegetables which have been opened to expose the pulp, embodying two co-operating traveling elements one operating within the other and between which the vegetable is presented. one of said elements embodying an apertured surface, the other element operating upon the vegetable to force the pulp therefrom and through the said apertured surface, means for presenting a cut vegetable between the said elements in such a position that the pulp side will be adjacent the said apertured surface and the co-operating element will operate against the outside of the skin, whereby the skin will not be ruptured and will serve as a plunger against the pulp, and means for collecting and conveying away the disintegrated pulp as it passes through said surface.

14. A machine for making food products from vegetables which have been opened to expose the pulp, embodying two co-operating traveling elements between which the vegetable is presented, one of said elements embodying an annular apertured surface, the other element operating within the last recited element and upon the vegetable to force the pulp therefrom and through the said apertured surface, means for presenting a cut vegetable between the said elements in such a position that the pulp side of each of the cut pieces will be adjacent the said apertured surface and the co-operating element will operate against the outside of the skin, whereby the skin will not be ruptured and will serve as a plunger against the pulp, and means for removing the skins from between the elements independently of the pulp.

15. A machine for making food products from vegetables embodying two co-operating traveling elements having the same direction of movement and between which the cut vegetable is presented, and pressed, one of said elements embodying a reticulated or perforated surface through which the pulp passes during the pressing operation, a cutter for cutting the vegetable to expose the pulp, and means for delivering the cut vegetable, between the said elements so that the exposed pulp surface of each of the cut parts of the vegetable will be adjacent the same reticulated surface.

16. A machine for making food products from vegetables embodying two eccentrically arranged rotatable elements, one within the other, one of said elements embodying a reticulated or perforated surface through which the pulp is passed by the other element, a cutter for cutting the vegetable to expose the pulp, and means for delivering the cut vegetable between the said elements so that the exposed pulp surface will be adjacent the said reticulated surface.

17. A machine for making food products from vegetables embodying two eccentrically arranged rotatable elements, one within the other, one of said elements embodying a reticulated or perforated surface through which the pulp is passed by the other element, a cutter for cutting the vegetable to expose the pulp, means for delivering the cut vegetable between the said elements so that the exposed pulp surface will be adjacent the said reticulated surface, and means operating between the said elements to remove the skins separately from the pulp.

18. A machine for making food products from vegetables which have been opened to expose the pulp, embodying a traveling reticulated or perforated surface to which the exposed pulp portion of the vegetable is presented, means co-operating with the said surface having the same direction of movement therewith and operating against the outside of the skin to force the pulp from the skin and through the said surface, a cutter for cutting the vegetable, and a support for receiving the cut vegetable, the said cutter being wedge shaped to force the cut particles of the vegetable to separate with the exposed pulp portion uppermost.

19. A machine for making food products from vegetables which have been opened to expose the pulp, embodying a traveling reticulated or perforated surface to which the exposed pulp portion of the vegetable is presented, means co-operating with the said surface having the same direction of movement therewith and operating against the outside of the skin to force the pulp from the skin and through the said surface, a cutter for cutting the vegetable, said cutter being wedge shaped to force the cut portions of the vegetable to separate, and means for receiving the cut portions of the vegetable and conveying them between the said elements in a manner that the exposed pulp portion of each of the cut portions of the vegetable will be adjacent the same reticulated surface.

20. A machine for making food products from vegetables embodying means for serving the vegetable, a traveling reticulated surface, means for delivering the pulp side of each of the severed parts of the vegetable against the said reticulated surface, and means co-operating with said surface and traveling in the same direction therewith for forcing the pulp from the cut parts of the vegetable out of the skin from the skin side and through the said reticulated surface.

21. A machine for making food products from vegetables embodying means for severing the vegetable, a traveling reticulated surface, means for simultaneously delivering the pulp side of each of the severed parts of the vegetable against the same reticulated surface, and means co-operating with said surface and traveling in the same direction therewith for forcing the pulp from the cut parts of the vegetable out of the skin from the skin side and through the said reticulated surface.

22. A machine for making food products from vegetables embodying means for severing the vegetable, a traveling reticulated surface, means for simultaneously delivering the pulp side of each of the severed parts of the vegetable against the same reticulated surface, and means co-operating with said surface and traveling in the same direction therewith for forcing the pulp from the cut parts of the vegetable out of the skin from the skin side and through the said reticulated surface, the first recited means operating also to spread or separate the cut parts of the vegetable.

23. A machine for making food products embodying a traveling reticulated surface, means for severing the vegetable to expose the pulp on each part of the cut vegetable, means operating automatically to position the exposed pulp portion on each of the cut parts against the same reticulated surface, and means co-operating with the said surface and traveling in the same direction therewith to force the pulp from the skins of the said parts through the said surface and without disrupting the skin.

24. A machine for making food products embodying a traveling reticulated surface, means for severing the vegetable to expose the pulp on each part of the cut vegetable, means operating automatically to position the exposed pulp portion on each of the cut parts against the same reticulated surface, means co-operating with the said surface and traveling in the same direction therewith to force the pulp from the skins of the said parts through the said surface and without disrupting the skin, and means for removing the skins separately from the pulp.

25. A machine for making food products embodying a traveling reticulated surface, means for severing the vegetable to expose the pulp on each part of the cut vegetable, means operating automatically to position the exposed pulp portion on each of the cut parts against the same reticulated surface, means co-operating with the said surface and traveling in the same direction therewith to force the pulp from the skins of the said parts through the said surface and without disrupting the skin, and a scraper operating against one face of the said surface for removing the skins separately from the pulp.

26. A machine for making food products embodying a traveling reticulated surface, means for severing the vegetable to expose the pulp on each part of the cut vegetable, means operating automatically to position the exposed pulp portion on each of the cut parts against the same reticulated surface, means co-operating with the said surface and traveling in the same direction therewith to force the pulp from the skins of the said parts through the said surface and without disrupting the skin, and means operating against one face of the surface and against the last recited means for removing the skins.

27. A machine for making food products embodying a traveling reticulated surface, a cutter for cutting the vegetables, means for receiving the cut portions of the vegetable with the pulp side of each part outermost, the said means operating to convey the cut portions of the vegetable to the recticulated surface and presenting the pulp side of each of the cut parts to the same reticulated surface, and means co-operating with such surface, traveling in the same direction therewith and operating upon the vegetable from the skin side to force the pulp therefrom and through the said reticulated surface.

28. A machine for making food products embodying a traveling reticulated surface, a cutter for cutting the vegetables, means for receiving the cut portions of the vegetable with the pulp side of each part outermost, the said means operating to convey the cut portions of the vegetable to the reticulated surface and simultaneously presenting the pulp side of each of the cut parts to the same reticulated surface, and means co-operating with such surface traveling in the same direction therewith and operating upon the vegetable from the skin side to force the pulp therefrom and through the said reticulated surface, the said cutter also operating to cause the parts of the vegetable to assume the said positions.

In testimony whereof I have signed my name to this specification on this 23rd day of July, A. D. 1919.

THOMAS CHARLTON.